(12) United States Patent
Guo et al.

(10) Patent No.: US 11,625,854 B2
(45) Date of Patent: Apr. 11, 2023

(54) INTELLIGENT FORKLIFT AND METHOD FOR DETECTING POSE DEVIATION OF CONTAINER

(71) Applicant: BEIJING GEEKPLUS TECHNOLOGY CO. LTD., Beijing (CN)

(72) Inventors: Xiaoli Guo, Beijing (CN); Ningning Yang, Beijing (CN)

(73) Assignee: BEIJING GEEKPLUS TECHNOLOGY CO. LTD., Beijing (CN)

( * ) Notice: Subject to any disclaimer, the term of this patent is extended or adjusted under 35 U.S.C. 154(b) by 0 days.

(21) Appl. No.: 17/508,784

(22) Filed: Oct. 22, 2021

(65) Prior Publication Data

US 2022/0067960 A1     Mar. 3, 2022

Related U.S. Application Data

(63) Continuation of application No. PCT/CN2019/128048, filed on Dec. 24, 2019.

(30) Foreign Application Priority Data

Apr. 25, 2019 (CN) .......................... 201910337791.X

(51) Int. Cl.
*G06T 7/73* (2017.01)
*G06T 7/62* (2017.01)
(Continued)

(52) U.S. Cl.
CPC .............. *G06T 7/73* (2017.01); *B66F 9/0755* (2013.01); *B66F 17/003* (2013.01); *G06T 7/50* (2017.01);
(Continued)

(58) Field of Classification Search
CPC .... G06T 7/73; G06T 7/50; G06T 7/62; G06T 2207/10024; G06T 2207/10028;
(Continued)

(56) References Cited

U.S. PATENT DOCUMENTS 3,822,766 A    7/1974 Suter
10,328,578 B2 * 6/2019 Holz ..................... B66F 9/0755

FOREIGN PATENT DOCUMENTS

CN    106672859    5/2017
CN    107031629    8/2017
(Continued)

OTHER PUBLICATIONS

English Translation of CN107610176A (Year: 2018).*
(Continued)

*Primary Examiner* — Jon Chang
(74) *Attorney, Agent, or Firm* — Hodgson Russ LLP

(57) ABSTRACT

An intelligent forklift and a method for detecting a pose deviation of a container are provided. The intelligent forklift includes a working state monitor, an image sensor, and a processor. The working state monitor is configured to monitor a working state of the intelligent forklift while the intelligent forklift is carrying and moving a stock container and send a trigger to the image sensor based on the working state. The image sensor is configured to capture an RGBD image frame containing the stock container in response to the trigger and to transmit the RGBD image frame to the processor. The processor is configured to receive the RGBD image frame, detect a pose deviation degree of the stock container and provide an alarm and/or a prompt based on a detection result of the pose deviation degree for adjusting the pose of the stock container.

17 Claims, 4 Drawing Sheets

(51) Int. Cl.
  *G06T 7/50* (2017.01)
  *G06V 10/22* (2022.01)
  *B66F 9/075* (2006.01)
  *B66F 17/00* (2006.01)

(52) U.S. Cl.
  CPC ............... *G06T 7/62* (2017.01); *G06V 10/22* (2022.01); *G06T 2207/10024* (2013.01); *G06T 2207/10028* (2013.01)

(58) Field of Classification Search
  CPC ..... B66F 9/0755; B66F 17/003; G06V 10/22; G01C 11/00; G01C 11/04
  See application file for complete search history.

(56) References Cited

FOREIGN PATENT DOCUMENTS

| | | |
|---|---|---|
| CN | 107123142 | 9/2017 |
| CN | 107123142 A | 9/2017 |
| CN | 107218927 | 9/2017 |
| CN | 107562049 | 1/2018 |
| CN | 107610176 A * | 1/2018 |
| CN | 109368552 | 2/2019 |
| CN | 109573897 | 4/2019 |
| CN | 109650292 | 4/2019 |
| CN | 110054121 | 7/2019 |
| DE | 2932899 | 11/1980 |
| JP | 2006017634 A | 1/2006 |
| JP | 2006213503 A | 8/2006 |
| JP | 2006240873 | 9/2006 |
| JP | 2007084162 A | 4/2007 |
| JP | 2008265909 A | 11/2008 |
| JP | 2010100408 | 5/2010 |
| JP | 2015202956 A | 11/2015 |
| JP | 2015228184 A | 12/2015 |
| KR | 101834336 | 3/2018 |

OTHER PUBLICATIONS

Molter et al. "Real-Time Pallet Localization with 3D Camera Technology for Forklifts in Logistic Environments." IEEE International Conference on Service Operations and Logistics, and Informatics, Jul. 31, 2018, pp. 297-302 (Year: 2018).*
Byun et al. "Real-time Positioning and Orienting of Pallets Based on Monocular Vision." IEEE International Conference on Tools with Artificial Intelligence, Nov. 3, 2008, pp. 505-508 (Year: 2008).*
Cui et al. "A Robust Autonomous Mobile Forklift Pallet Recognition." 2nd International Asia Conference on Informatics in Control, Automation and Robotics, Mar. 6, 2010, pp. 286-290 (Year: 2010).*
Walter et al. "Closed-Loop Pallet Manipulation in Unstructured Environments." IEEE/RSJ International Conference on Intelligent Robots and Systems, Oct. 18, 2010, pp. 5119-5126 (Year: 2010).*
CNIPA, Second Office Action for CN Application No. 201910337791.X, dated Jun. 9, 2020.
CNIPA, Third Office Action for CN Application No. 201910337791.X, dated Oct. 28, 2020.
CNIPA, Notification to Grant Patent for CN Application No. 201910337791.X, dated Mar. 23, 2021.
CNIPA, First Office Action for CN Application No. 201910337791.X, dated Jan. 2, 2020.
WIPO, International Search Report and Written Opinion for International Application No. PCT/CN2019/128048, dated Mar. 26, 2020.
Bellomo et al., "Pallet Pose Estimation with LIDAR and Vision for Autonomous Forklifts," Proceedings of the 13th IFAC Symposium on Information Control Problems in Manufacturing, Jun. 2009.
EPO, Extended European Search Report for EP Application No. 19926162.9, dated Sep. 6, 2022.
JPO, Office Action for JP Application No. 2021-563272, dated Jun. 21, 2022.
KIPO, Notice of Allowance for KR Application No. 10-2021-7035759, dated Sep. 5, 2022.
JPO, Notice of Allowance for JP Application No. 2021-563272, dated Dec. 13, 2022.

* cited by examiner

US 11,625,854 B2

INTELLIGENT FORKLIFT AND METHOD FOR DETECTING POSE DEVIATION OF CONTAINER

CROSS-REFERENCE TO RELATED APPLICATIONS

This application is a continuation application of International Application No. PCT/CN2019/128048, filed on Dec. 24, 2019, which claims priority to Chinese Patent Application No. 201910337791.X, filed on Apr. 25, 2019, the entire contents of which are incorporated herein by reference.

TECHNICAL FIELD

Embodiments of the disclosure relate to a field of intelligent bin storage technologies, for example, an intelligent forklift and a method for detecting a pose deviation of a container.

BACKGROUND

With rapid development of modern bin storage technology, forklifts are playing an increasingly important role in a field of bin storage. The forklift can support a stock container such as a pallet to realize moving and storage of items.

In related arts, the forklift can be manually driven to move to a storage location of a stock container to be moved. The stock container to be moved can be lifted up through a fork of the forklift to pick up the stock container to be moved. While carrying and moving the stock container, a staff may pay attention to a position of the stock container on the fork all the time, such that the items can be safely and stably moved and stored to a designated storage location. In addition, in an intelligent bin storage scenario, a moving route can be set for the intelligent forklift in advance and the intelligent forklift can move to the storage location of the stock container to be moved based on the moving route. By recognizing an identifier on a bottom surface of the stock container, the stock container is lifted, moved, and stored.

SUMMARY

In one embodiment, an intelligent forklift is provided. The intelligent forklift includes: a working state monitor, an image sensor, and a processor. The working state monitor is configured to monitor a working state of the intelligent forklift while the intelligent forklift is carrying and moving a stock container to be moved, and send a trigger to the image sensor based on the working state. The image sensor is configured to capture red-green-blue-depth (RGBD) image frames containing the stock container to be moved in response to the trigger from the working state monitor, and to transmit the RGBD image frames to the processor. The processor is configured to receive the RGBD image frames, detect a pose deviation degree of the stock container to be moved based on the RGBD image frames; provide an alarm and/or a prompt based on a detection result of the pose deviation degree for adjusting the pose of the stock container to be moved on the intelligent forklift.

In one embodiment, a method for detecting a pose deviation of a container is provided. The method includes: capturing red-green-blue-depth (RGBD) image frames of a stock container to be moved in response to monitoring an action of lifting up the stock container to be moved by an intelligent forklift is finished, in which a red-green-blue (RGB) image and a depth map are determined from each RGBD image frame; determining, from the RGB image of a current RGBD image frame, a position of the stock container to be moved in the RGB image based on a predetermined container recognition model; cutting, from the depth map of the current RGBD image frame, a target region of interest containing the stock container to be moved based on the position of the stock container to be moved in the RGB image; and detecting a current pose deviation degree of the stock container to be moved based on a depth feature of the target region of interest, an area feature of the target region of interest, a depth feature of a preset template to be compared, an area feature of the preset template to be compared, a preset depth feature threshold, and a preset area feature threshold.

In one embodiment, a non-transitory computer-readable storage medium having computer programs stored thereon is provided. When the computer programs are executed by a processor, a method for detecting a pose deviation of a container as described above is executed.

DETAILED DESCRIPTION

The disclosure will be described in detail below with reference to the accompanying drawings and the embodiments. It is be understood that, the specific embodiments described herein are only used to explain the disclosure rather than to limit the disclosure. In addition, it should also be noted that, for convenience of description, only part but not all structures related to the disclosure are illustrated in the accompanying drawings.

In related arts, in a process of moving a stock container by an intelligent forklift, it is difficult for humans to timely, accurately, and effectively observe a pose of the stock container on a fork of the intelligent forklift, which increases an operation difficulty and a cost of manual intervention. In addition, the intelligent forklift cannot realize intelligent detection of the pose of the stock container on the fork, which reduces the efficiency and safety of moving the stock container by the intelligent forklift.

In view of this, embodiments of the disclosure provide an intelligent forklift and a method for detecting a pose deviation of a container, which will be described in detail below.

Figure 1:
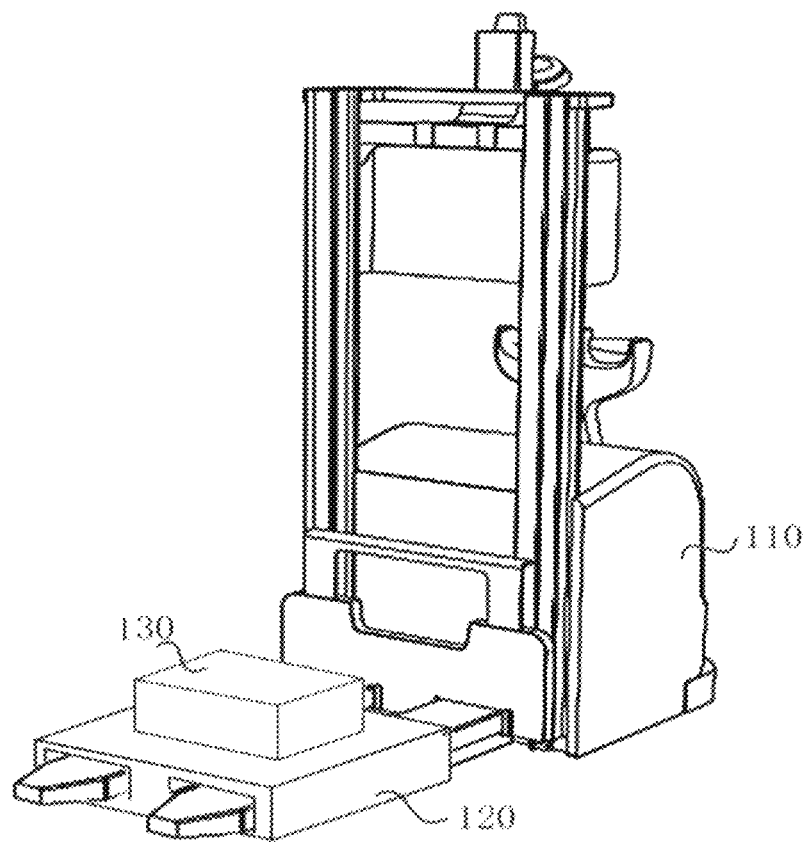
FIG. 1 is an example diagram illustrating an intelligent forklift carrying a stock container according to embodiments of the disclosure.

FIG. 1 illustrates an example diagram illustrating an intelligent forklift carrying and moving a stock container. As illustrated in FIG. 1, an intelligent forklift 110 carries a stock container 120 through a fork, such that the stock container 120 is placed on the fork of the intelligent forklift 110 and is moved. In this embodiment, two side walls of the stock container 120 each is provided with a fork hole structure corresponding to the fork of the intelligent forklift 110. For example, the stock container 120 is a pallet. The intelligent forklift 110 inserts the fork into the fork hole structure to carry and move the stock container 120. An item 130 may be placed on the stock container 120. In a bin storage scenario, the stock container 120 may be placed in a storage region, such as an item shelf in the storage region, or placed in a sorting region, such as a workstation. Therefore, the intelligent forklift 110 carries and moves the stock container 120 in the bin storage scenario based on requirements.

Figure 2:
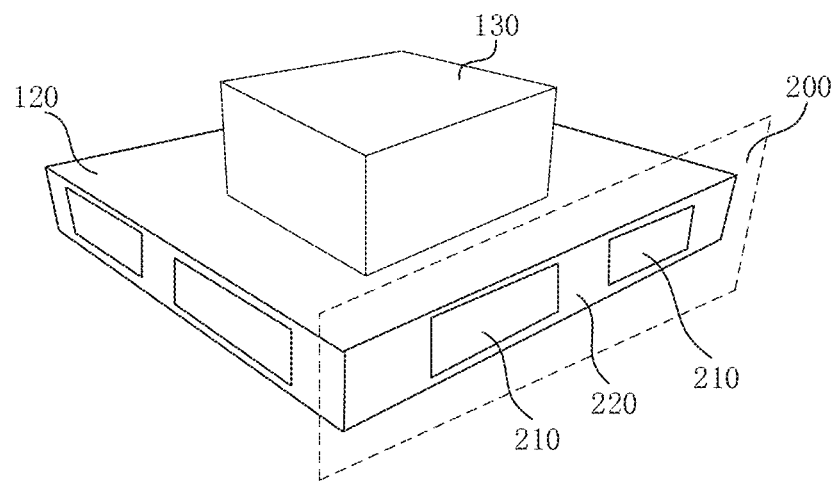
FIG. 2 is a schematic diagram illustrating a structure of a stock container according to embodiments of the disclosure.

FIG. 2 is a schematic diagram illustrating a stock container according to some embodiments of the disclosure. As illustrated in FIG. 2, the stock container 120 may be a regular or irregular cuboid. The stock container 120 has four side walls, and at least two side walls of the stock container 120 that are opposite to each other each has a fork hole structure 200. The fork hole structure 200 includes a fork hole sub-structure 210 and a frame sub-structure 220 of the stock container 120 itself. The item 130 can be directly placed on the stock container 120 or the item 130 can be placed on the stock container 120 in any suitable manner. For example, the item 130 is placed in a bin on the stock container 120. In an embodiment, the bin may be separated from the stock container 120 or the bin may be integrated with the stock container 120. One or more items 130 may be placed in a bin.

Figure 3:
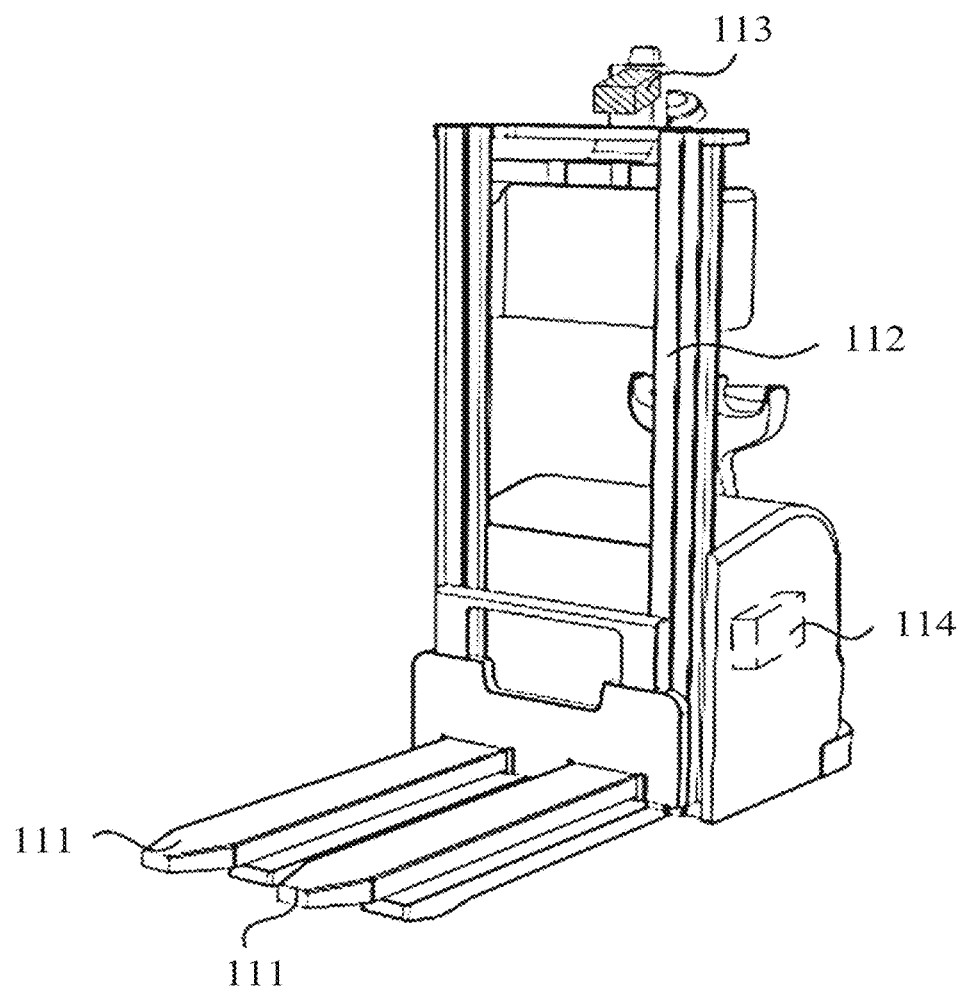
FIG. 3 is a schematic diagram illustrating an intelligent forklift according to embodiments of the disclosure.

FIG. 3 is a schematic diagram illustrating an intelligent forklift according to some embodiments of the disclosure. As illustrated in FIGS. 1 and 3, in an example, the intelligent forklift 110 may include a fork 111 and a sliding rail 112. The fork 111 of the intelligent forklift 110 can move up and down within a certain height range through the sliding rail 112. The intelligent forklift 110 can move to the storage location of the storage region such as an exit of item shelves, insert the fork 111 into the fork hole structure 200 of the stock container 120 to carry the stock container 120, and move the stock container 120 to a designated location such as an assigned connection location or a workstation. The staff (or an automated device such as a robotic arm) at a picking workstation selects items from the stock container 120. The designated location is not limited to the connection location or the workstation in embodiments of the disclosure and any transport destination can be included in the embodiments.

In addition, in an example, the intelligent forklift 110 at least includes a container image capturing module 113, such as a depth camera. The container image capturing module 113 can capture an image containing the fork 111, the stock container 120 on the fork 111, and the item 130 on the stock container 120, to obtain an image completely containing the stock container 120 and the item 130. Correspondingly, the intelligent forklift 110 further includes a processing module 114. The processing module 114 is configured to process the image captured by the container image capturing module 113, to detect a pose deviation degree of the stock container 120.

While the intelligent forklift 110 is carrying and moving the stock container 120, the container image capturing module 113 is triggered to capture an image of the stock container 120 on the fork 111 based on monitoring that an action of lifting up the stock container 120 by the fork 111 is finished. The processing module 114 recognizes the stock container 120 based on the captured image and determines a current pose deviation degree of the stock container 120, such that an alarm and/or a prompt is provided based on a detection result of the pose deviation degree for adjusting the pose of the stock container 120 on the fork 111 and moving the stock container 120 is continued.

In an existing bin storage system, the forklift can be manually moved to the storage location of the stock container to be moved and the stock container to be moved is lifted by the fork of the forklift, i.e., the stock container to be moved is picked up. While the stock container is being moved, the staff pays attention all the time to the position of the stock container on the fork to realize safely and stably moving and storing the items to the designated storage location. In addition, in an intelligent bin storage scenario, a moving route can be set for the intelligent forklift in advance and the intelligent forklift can move to the storage location of the stock container to be moved based on the moving route. By recognizing an identifier on a bottom surface of the stock container, the stock container is lifted up, moved and stored. However, it is difficult for humans to timely, accurately and effectively observe a pose of the stock container on the fork, which increases the operation difficulty and the cost of manual intervention. In addition, the intelligent forklift cannot realize intelligent detection of the pose of the stock container on the fork, which reduces the efficiency and safety of moving the stock container by the intelligent forklift.

Descriptions may be made to the intelligent forklift according to embodiments of the disclosure with multiple embodiments below.

Embodiment 1

Figure 4:
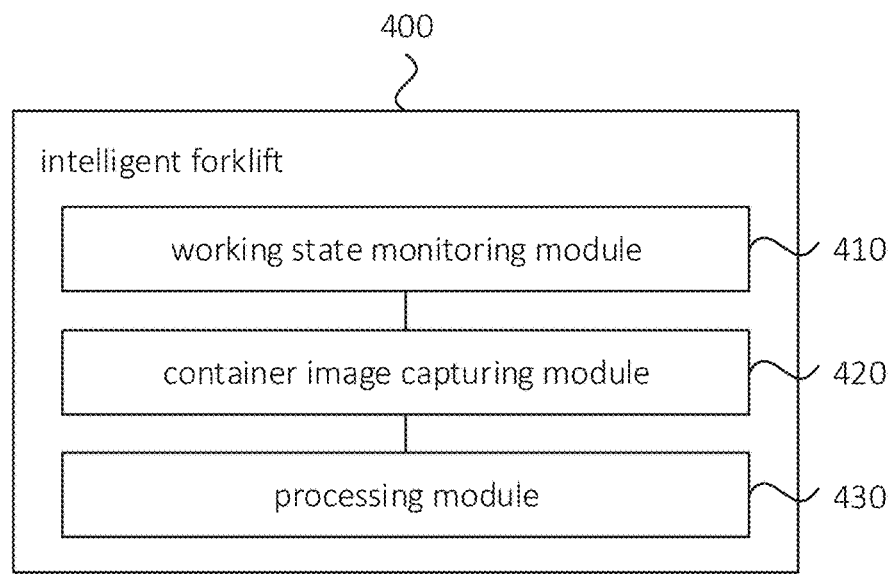
FIG. 4 is a schematic diagram illustrating another intelligent forklift according to embodiments of the disclosure.

FIG. 4 is a block diagram illustrating an intelligent forklift according to embodiments of the disclosure. This embodiment is applicable to a case where the intelligent forklift carries and moves a stock container. The intelligent forklift 400 includes: a working state monitoring module 410, a container image capturing module 420, and a processing module 430. The container image capturing module 420 is electrically connected to the working state monitoring module 410 and the processing module 430.

In this embodiment, the working state monitoring module 410 is configured to monitor a working state of the intelligent forklift while the intelligent forklift is carrying and moving a stock container to be moved and control the container image capturing module 420 to capture an image based on the working state. The container image capturing module 420 is configured to capture red-green-blue-depth (RGBD) image frames of the stock container to be moved in response to a trigger from the working state monitoring module and transmit the RGBD image frames to the processing module 430. The processing module 430 is configured to receive the RGBD image frames feedback by the container image capturing module 420, detect a pose deviation degree of the stock container to be moved based on the RGBD image frames, and provide an alarm and/or a prompt based on a detection result of the pose deviation degree for adjusting the pose of the stock container on the intelligent forklift.

In this embodiment, the working state monitoring module 410 has a function of monitoring working states of multiple mechanical structures of the intelligent forklift. The working state monitoring module 410 can be installed in the intelligent forklift in a form of hardware. The installation position of the working state monitoring module 410 is not limited. The working state monitoring module can also be integrated in a software processing program of the intelligent forklift in a form of software. In an embodiment, the working state monitoring module 410 can monitor the working state of the intelligent forklift while the intelligent forklift is carrying and moving the stock container based on data such as a position of the intelligent forklift, a lifting height of the fork, a load capacity of the fork, and a travelling progress of the intelligent forklift. For example, the working state includes that the stock container is lifted up, the stock container is being moved and the stock container is released from the fork. Based on the monitored working state, an operation state of the container image capturing module 420 is controlled, for example, the container image capturing module 420 is triggered to perform the image capturing action or stop the image capturing action.

The container image capturing module 420 has a function of image capturing. The container image capturing module 420 is installed on the intelligent forklift and is configured to capture an image of the stock container on the fork of the intelligent forklift and the item carried on the stock container in real time. After the container image capturing module 420 is triggered to start the image capturing action, continuous image frames are captured. There may be one or more of the container image capturing modules 420 installed on the intelligent forklift. For example, the container image capturing modules 420 can be installed at all height-level positions that the fork of the intelligent forklift may pass or a container image capturing module 420 is installed above the fork, i.e., at the top of the intelligent forklift.

The processing module 430 may have functions of image recognizing, data processing, container pose detecting, and alarm outputting. The processing module 430 is installed in the intelligent forklift and the installation position of the processing module 430 is not limited. In an embodiment, the processing module 430 may receive the image frames fed back by the container image capturing module 420 in real time, recognize the stock container based on the image frames, determine features of the stock container based on a recognition result, and finally detect the pose deviation degree of the stock container based on the features of the stock container.

In this embodiment, the connection manners between the container image capturing module 420 and the working state monitoring module 410 and between the container image capturing module 420 and the processing module 430 may be electrical connection or communication connection. Data or instructions can be transmitted through the electrical connection or the communication connection.

In this embodiment, the stock container to be moved refers to a stock container that can be carried and moved by a forklift in a bin storage scenario, such as a pallet. Correspondingly, this type of stock containers to be moved has the fork hole structure matching the fork of the forklift. The fork can be inserted into the fork hole structure to lift and move the stock container to be moved. This type of stock containers to be moved can be placed anywhere in a bin storage environment, for example, in the storage region. In an embodiment, the stock container to be moved may be placed on an item shelf in the storage region. When the fork of the intelligent forklift moves to a position having the same height as the stock container to be moved and is aligned to the fork hole structure of the stock container to be moved, the fork is inserted to the fork hole structure of the stock container to be moved, such that the intelligent forklift carries the stock container to be moved, to realize the picking and moving the stock container to be moved.

In an embodiment, the container image capturing module 420 may be a red-green-blue-depth (RGBD) image sensor, such as Kinect. The RGBD image sensor is configured to capture the RGBD images. Each pixel in an RGBD image has red (R) pixel information, green (G) pixel information, blue (B) pixel information, and corresponding depth information. The R color information, the G color information, and the B color information of each pixel in the RGBD image collectively form a red-green-blue (RGB) image. The depth information of each pixel in the RGBD image collectively forms a two-dimensional pixel matrix of the scene, that is, a depth map. A pixel value of each pixel in the depth map represents a distance between a point of the object corresponding to the pixel and a plane where the container image capturing module 420 is located. The position of a pixel corresponds to a position of the point of the object corresponding to the pixel in the scene and corresponds to a position in the associated RGB image.

In an embodiment, for moving the stock container to be moved, the intelligent forklift follows a preset route and moves to the storage location where the stock container to be moved is located, such as the storage region or an item shelf region where the pallet having the fork hole structure is stored. The intelligent forklift controls to lift up or down the fork to a position having the same height as the storage location of the stock container to be moved. In an embodiment, the working state monitoring module 410 can monitor the height where the fork is located, the weight carried, or the operation action of the fork. When it is monitored that the height where the fork is located is the same with the height where the stock container to be moved is located as well as the action of lifting up the stock container to be moved is finished, the container image capturing module 420 is triggered to continuously capture RGBD image frames. The container image capturing module 420 is configured to capture the RGBD image frames of the stock container to be moved in response to the trigger from the working state monitoring module and transmit the RGBD image frames to the processing module 430.

Therefore, the processing module 430 receives the RGBD image frames fed back by the container image capturing module 420, identifies the stock container to be moved from the RGBD image frames based on a predetermined container recognition model, and determines, from an RGB image of a current RGBD image frame, a position of the stock container to be moved in the RGB image. In addition, the processing module 430 is configured to cut a target region of interest containing the stock container to be moved from a depth map of the current RGBD image frame based on the position of the stock container to be moved in the RGB image. Furthermore, the processing module 430 is configured to determine a depth feature and an area feature of the target region of interest based on the target region of interest having depth information to detect a current pose deviation degree of the stock container to be moved. In this embodiment, the detection of the pose deviation degree may include a detection of a relative deviation degree between the stock container to be moved and the fork, and may further include a detection of a relative deviation degree between the item on the stock container to be moved and the stock container to be moved.

Therefore, while the intelligent forklift according to embodiments of the disclosure is carrying and moving the stock container to be moved, the pose deviation degree of the stock container to be moved on the fork and the pose deviation degree of the item placed on the stock container to be moved are detected all the time, such that an alarm and/or a prompt are provided in response to determining that a position deviation of the item or the stock container to be moved on the fork is relatively large, for adjusting the pose of the stock container to be moved and/or the item on the fork of the intelligent forklift by a staff or a robot. After the pose is adjusted, the intelligent forklift continues to move the stock container or the item until the intelligent forklift moves the stock container to be moved to a destination and release the stock container to be moved and the image capturing and detecting are stopped. Therefore, a problem that the stock container to be moved and/or the item cannot be moved safely or normally due to changes in the pose of the stock container to be moved and/or the item can be solved, and it may ensure that the stock container to be moved and/or the item is stably placed on the fork during the entire moving process of the stock container to be moved.

With the technical solution according to embodiments of the disclosure, the container image capturing module installed in the intelligent forklift is utilized to capture the RGBD images of the stock container on the fork while the stock container is moved. Therefore, based on the RGBD image frames captured all the time, the pose deviation degree of the stock container on the fork is detected, and an alarm and/or a prompt are provided based on the detection result of the pose deviation degree for adjusting the pose of the stock container to be moved on the intelligent forklift. In embodiments of the disclosure, by capturing the RGBD images of the stock container on the fork and identifying the container, effective detection of the pose deviation of the stock container on the fork is realized, the problem that the stock container to be moved cannot be safely moved caused by the position of the stock container changes on the fork due to external forces applied on the stock container to be moved or emergency brakes of the forklift while the stock container is being moved can be solved, and the efficiency and safety of carrying and moving the stock container by the forklift are improved.

Embodiment 2

Based on the first embodiment, this embodiment provides an implementation of the intelligent forklift, which can detect the pose deviation degree of the stock container to be moved by identifying the stock container to be moved and determining features.

In an embodiment, the container image capturing module 420 includes at least one camera. Each camera is installed above the fork of the intelligent forklift.

In an embodiment, the RGBD image frame includes an RGB image and a depth map. An image used to represent the stock container to be moved in the RGBD image frame is located in a designated region of the RGBD image frame.

In an embodiment, the working state monitoring module 410 is configured to control the container image capturing module 420 to capture images based on the working state by: triggering the container image capturing module 420 to perform the image capturing action in response to monitoring an action of lifting up the stock container to be moved by the intelligent forklift is finished; and stopping an image capturing action of the container image capturing module 420 in response to monitoring an action of placing the stock container to be moved by the intelligent forklift is finished.

In this embodiment, the container image capturing module 420 may be a device capable of capturing the RGBD image, such as a depth camera or a Kinect sensor. In an embodiment, the container image capturing module 420 includes at least one camera which may be installed at each height-level position that the fork may pass or installed above the fork, i.e., at the top of the intelligent forklift. Further, after the fork finishes the action of lifting up the stock container to be moved, the camera can project and capture the RGBD image frame completely containing the stock container to be moved and the items on the stock container to be moved.

In this embodiment, in a case that a distance or a relative height of the camera of the container image capturing module 420 with respect to the pallet changes, the captured image may contain an invalid image of surrounding environment, such as the ground. To improve the detection efficiency of the pose of the stock container to be moved, only the region(s) containing the stock container to be moved and the item on the stock container to be moved can be detected. Therefore, the position of the stock container in the captured image can be determined based on the height where the fork is located and an inherent relative positional relationship between the fork and the camera under this height, such that in the captured image, an image representing the stock container to be moved is generally located within a designated region of the captured image when the captured image is obtained.

In this embodiment, the working state monitoring module 410 can monitor the height where the fork is located, the carried weight, or the operation action of the fork. If it is monitored that the fork moves to a height where the stock container to be moved is located and the action of lifting up the stock container to be moved is completed, the container image capturing module 420 is triggered to continuously capture the RGBD image frames. If it is monitored that the fork moves to a height where a target storage position is located and the action of releasing the stock container to be moved is finished, the container image capturing module 420 is controlled to stop the image capturing action.

In an embodiment, the processing module 430 is configured to detect the pose deviation degree of the stock container to be moved based on the RGBD image frames by the following. A position of the stock contained to be moved in the RGB image of a current RGBD image frame is determined from the RGB image based on a predetermined container recognition model. A target region of interest containing the stock container to be moved is cut from the depth map of the current RGBD image frame based on the position of the stock container to be moved in the RGB image. A depth feature and an area feature of the target region of interest are determined. A depth feature difference and an area feature difference are determined based on the depth feature and the area feature of the target region of interest, and a depth feature and an area feature of a preset template to be compared. A current pose deviation degree of the stock container to be moved is detected based on the depth feature difference, the area feature difference, a preset depth feature threshold and a preset area feature threshold.

In an embodiment, the processing module 430 is configured to determine the depth feature and the area feature of the target region of interest by the following. A down-sampled region of interest image is obtained by performing down-sampling on the target region of interest based on a preset number of layers. The depth feature of the target region of interest is obtained by summing up depth values of respective pixels contained in the down-sampled region of interest image. An area of the down-sampled region of interest image is determined to obtain the area feature of the target region of interest.

In an embodiment, the preset template to be compared at least includes a standard container template and a previous RGBD image frame of the current RGBD image frame.

In an embodiment, the standard container template is obtained based on a mean value of the depth features and a mean value of the area features of a preset number of initially captured RGBD image frames.

In an embodiment, the processing module 430 is configured to detect the current pose deviation degree of the stock container to be moved based on the depth feature difference, the area feature difference, the preset depth feature threshold and the preset area feature threshold by the following. It is determined that there is a deviation in a pose of the stock container on the intelligent forklift at a current moment, in response to detecting at least one feature difference is greater than a corresponding feature threshold based on the depth feature difference and the area feature difference between the current RGBD image frame and the standard container template, the depth feature difference and the area feature difference between the current RGBD image frame and the previous RGBD image frame of the current RGBD image frame, the preset standard depth feature threshold, the preset standard area feature threshold, the preset adjacent depth feature threshold, and the preset adjacent area feature threshold.

In an embodiment, the container identification model refers to a model configured to identify the stock container on the fork, which can be obtained through pre-training. In an embodiment, multiple scenes can be preset based on the above structure of the intelligent forklift and a large amount of RGB image samples can be captured while the intelligent forklift is carrying and moving the stock container in the multiple scenes. Depending on a certain scene, an RGB image sample may contain an entirety or a part of or not include the stock container and the item placed on the stock container. Thus, the RGB image samples are classified, where an RGB image containing the stock container is classified as a positive sample and an RGB image that does not contain the stock container is classified as a negative sample. The container identification model can be trained with a support vector machine (SVM) to obtain a trained container recognition model.

In this embodiment, the trained SVM model is configured to identify the RGB image of the current RGBD image frame. A smallest circumscribed rectangle is added for the stock container to be moved that is determined through the identification. Coordinates of at least two diagonal vertices of the smallest circumscribed rectangle of the RGB image are stored to represent the position of the stock container in the RGB image. For example, the coordinates of the upper left vertex and the lower right vertex are stored, which are used to represent the position and the size of the smallest circumscribed rectangle.

In this embodiment, the camera of the container image capturing module 420 is configured to capture images while the intelligent forklift is moving. During this period, the position of the camera and the position of the intelligent forklift are relatively fixed. Under a normal working condition, the relative position relationship between the stock container to be moved and the item does not change. Before determining the features, a filter can be used to denoise the depth map. For example, a Gaussian low-pass filter can be used to smooth the depth map and remove noise of the depth map caused by the camera shake or laser reception interference, such that accurate distance information of each pixel is obtained. In an embodiment, the size of the used Gaussian filter template is 3×3 or 5×5 with the standard deviation of 1. The denoising algorithm of the depth map in this embodiment is not limited to the Gaussian low-pass filter and any algorithm that can realize the denoising of the depth map can be applied in this embodiment.

In this embodiment, on the basis of the denoised depth map, since each pixel in the RGB image of the current RGBD image frame has an associated correspondence with a respective pixel in the depth map, representing different image information of the same scene, a same rectangular region can be cut from the depth image of the current RGBD image frame as the target region of interest based on the position of the stock container in the RGB image. Correspondingly, the target region of interest corresponds to the stock container to be moved and contains the depth information of the stock container to be moved.

In this embodiment, the depth feature and the area feature are used as key information of the target region of interest. The pose deviation degree of the stock container is detected based on the key information. In an embodiment, the depth feature refers to a sum of depth values of all pixels in the depth map, and the area feature refers to a total area of the depth map. Since the pixel resolution of the original image is relatively high, in order to improve the detection efficiency, in this embodiment, after obtaining the target region of interest, pyramid images may be constructed for the target region of interest by performing down-sampling on the target region of interest. In an embodiment, the number of layers for the pyramid images may be determined based on the camera focal length of the RGBD sensor. Therefore, for the down-sampled region of interest image, the sum of the depth values of all pixels in the down-sampled region of interest image is calculated as the depth feature and the total area of the down-sampled region of interest image is calculated as the area feature.

In this embodiment, the preset template to be compared may refer to a depth map of the stock container in a safe pose or a depth map of an image frame prior to the current RGBD image frame. In an embodiment, since the pose of the stock container to be moved is relatively safe and stable when the stock container to be moved is initially lifted up, a mean value of the depth maps of a preset number of initially captured RGBD image frames can be determined as a preset template to be compared. In addition, while the detection is performed based on the current RGBD image frame, the image frames prior to the current RGBD image frame are all without pose deviation or within the safe deviation range after the detection. Therefore, the depth map of a previous RGBD image of the current RGBD image frame can be used as a preset template to be compared. Further, the depth feature and the area feature of the preset template to be compared can be determined in the same manner of determining the depth feature and the area feature described above. The depth feature of the target region of interest is compared with the depth feature of the preset template to be compared to obtain the depth feature difference and the area feature of the target region of interest is compared with the area feature of the preset template to be compared to obtain the area feature difference.

In this embodiment, depending on a dangerous deviation degree of a certain scene, the depth feature threshold and the area feature threshold are predetermined. That is, the pose deviation degree is determined based on the depth feature difference and the area feature difference. If the determined pose deviation degree excesses a pose deviation limit defined by the depth feature threshold and/or the area feature threshold, it is determined that pose of the stock container to be moved currently deviates greatly and there is a potential safety risk, which can easily lead to unsafe or abnormal carrying or affect normal moving by other forklifts or robots in the bin storage environment. Therefore, when it is detected there is a large deviation, the processing module 430 controls the intelligent forklift to brake and outputs an alarm and/or a prompt, for adjusting the pose of the stock container to be moved or the item on the fork of the intelligent forklift by a staff or a robot. After the pose is adjusted, the intelligent forklift continues to move the stock container until the intelligent forklift moves the stock container to be moved to a destination and the stock container to be moved is released therefrom. At the same time, image capturing and detecting are stopped.

For example, the container identification can be performed on the RGB image of the current RGBD image frame. The smallest circumscribed rectangle of the stock container to be moved is determined in the image and the coordinates ($X_{LeftTop}$, $Y_{LeftTop}$) and ($X_{RightBottom}$, $Y_{RightBottom}$) of the smallest circumscribed rectangle are determined. The coordinates are used to represent the position of the stock container in the RGB image. The depth map in the current RGBD image frame is denoised by the Gaussian low-pass filter to obtain the denoised depth map $D_{filter}$. Based on the position, i.e., ($X_{LeftTop}$, $Y_{LeftTop}$) and ($X_{RightBottom}$, $Y_{RightBottom}$), a corresponding rectangular region is cut from the denoised depth map $D_{filter}$ as the target region of interest $R_{D1}$.

Given the number of layers for the pyramid images is 3, the down-sampling is performed on target region of interest $R_{D1}$, after the target region of interest $R_{D1}$ is down-sampled once to obtain the image $R_{D11}$, the size of the image $R_{D11}$ is ½ of the size of image $R_{D1}$, after performing the down-sampling twice to obtain the image $R_{D12}$, the size of the image $R_{D12}$ is ¼ of the size of the image $R_{D1}$ and after performing the down-sampling for three times to obtain the image $R_{D13}$, the size of the image $R_{D13}$ is ⅛ of the size of image $R_{D1}$. The depth values of all pixels in the image $R_{D13}$ are summed up to obtain the depth feature d. The area of the image $R_{D13}$ is used as the area feature a. That is, the key information of the current RGBD image frame can be [$R_{D13}$, d, a]. In an embodiment, a mean value of initial first three frames captured by the container image capturing module 420 in response to the trigger is used as the preset template to be compared. Based on the above calculation process of the depth feature and image feature, the key information mean values of the first three frames are used respectively as the depth feature and the image feature of the preset template to be compared, i.e., Src[$R_{D13}$, d, a]. At the same time, the previous RGBD image frame of the current RGBD image frame is used as the preset template to be compared, and the key information formed by the depth feature and the image feature of the previous RGBD image frame is determined as Current[$R_{D13}$, d, a] based on the above method of calculating the depth feature and the image feature.

In this way, the depth feature difference |d−Src(d)| and the area feature difference |a−Src(a)| between the current RGBD image frame and the initial three RGBD images can be obtained and the depth feature difference |d−Current(d)| and the area feature difference |a−Src(a)| between the current RGBD image frame and the previous RGBD image frame of the current RGBD image frame can be obtained. As an example, the depth feature threshold between the current RGBD image frame and the initial three RGBD image frames can be predetermined as $D_{CurrSrc}$ and the area feature threshold between the current RGBD image frame and the initial three RGBD image frames can be predetermined as $S_{CurrSrc}$, the depth feature threshold between the current RGBD image frame and the previous RGBD image frame of the current RGBD image frame can be predetermined as $D_{CurrLast}$, and the area feature threshold between the current RGBD image frame and the previous RGBD image frame of the current RGBD image frame can be predetermined as $S_{CurrLast}$, based on the dangerous deviation degree of a certain scenario. In this embodiment, the adjacent image frames are continuously changing. Therefore, the area of two adjacent image frames and the number of pixels in the two adjacent image frames are similar to each other under a normal working condition. When at least one of the four feature difference values |d−Src(d)|, |a−Src(a)|, |d−Current (d)| and |a−Current(a)| exceeds a corresponding feature threshold, it is determined that the pose of the stock container to be moved is currently deviated greatly. The intelligent forklift brakes and outputs an alarm based on the uploaded detection data. After manual intervention, the alarm is cancelled. After the adjustment is finished, the intelligent forklift continues to work.

With the technical solution of this embodiment, the container image capturing module is triggered to capture RGBD images of the stock container on the fork when it is monitored that the intelligent forklift lifts up the stock container. By identifying the stock container from the RGB image of the current RGBD image frame, the position of the stock container to be moved in the RGB image is determined. The target region of interest is cut from the depth map of the current RGBD image frame based on the position. Therefore, the depth feature and area feature of the target region of interest are determined. With the feature comparison is performed based on the preset template to be compared and the feature thresholds, the pose deviation degree of the stock container on the fork is detected based on the feature comparison result. The alarm or the prompt is output based on the detection result of the pose deviation degree for adjusting the pose of the stock container on the intelligent forklift. In this embodiment of the disclosure, by capturing the RGBD images containing the stock container on the fork and identifying the container, effective detection of the pose deviation of the stock container on the fork is realized, the problem that the stock container to be moved cannot be safely moved caused by the position of the stock container changes on the fork due to external forces applied on the stock container to be moved or emergency brakes of the forklift while the stock container is being moved can be solved, and the efficiency and safety of carrying and moving the stock container by the forklift are improved.

Embodiment 3

Figure 5:
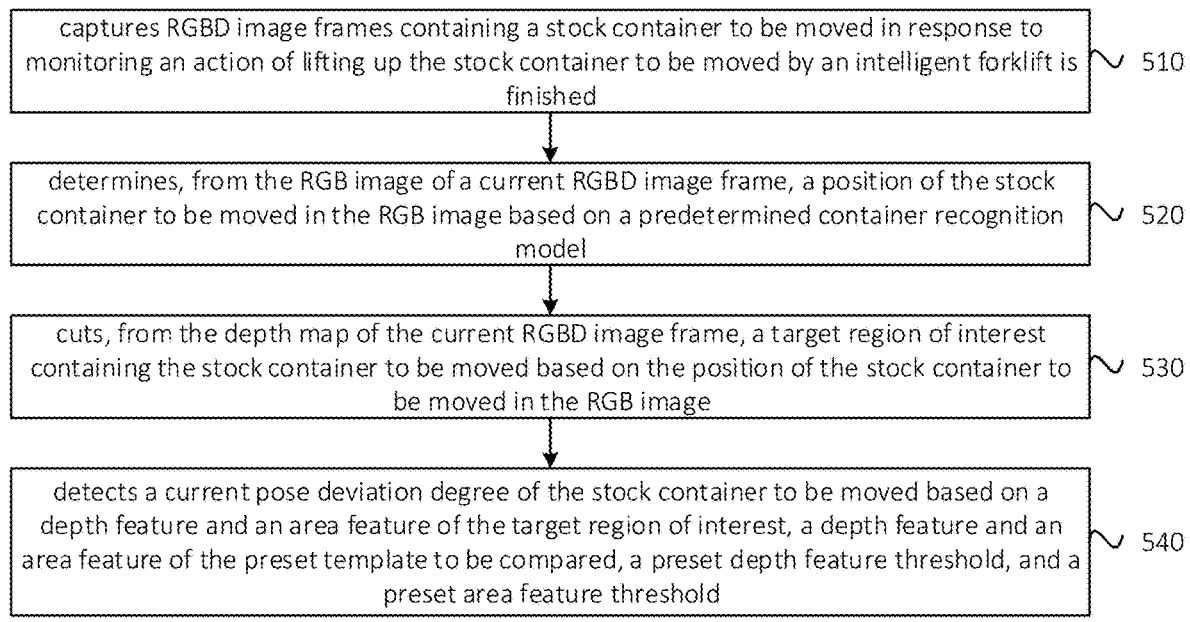
FIG. 5 is a flowchart illustrating a method for detecting a pose deviation of a container according to embodiments of the disclosure.

FIG. 5 is a flowchart illustrating a method for detecting a pose deviation of a container according to some embodiments of the disclosure. This embodiment is applicable to a case where an intelligent forklift carries and moves a stock container. This method can be executed by an apparatus for detecting a pose deviation of a container. The apparatus can be implemented by software and/or hardware. In an embodiment, the apparatus is integrated into the intelligent forklift. The method includes the following.

In block 510, RGBD image frames containing a stock container to be moved are captured in response to monitoring an action of lifting up the stock container to be moved by an intelligent forklift is finished.

In an embodiment, the stock container to be moved refers to a stock container that can be carried and moved by a forklift in a bin storage scenario, such as a pallet. Correspondingly, this type of stock containers to be moved has a fork hole structure matching the fork of the forklift. The fork can be inserted into the fork hole structure to lift and move the stock container to be moved. This type of stock containers to be moved can be placed anywhere in a bin storage environment, for example, in a storage region. In an embodiment, the stock container to be moved may be placed on an item shelf in the storage region. Further, when the fork of the intelligent forklift moves to a height where the stock container to be moved is located and the fork is aligned with the fork hole structure of the stock container to be moved, the fork is inserted into the fork hole structure of the stock container to be moved, such that the intelligent forklift carries the stock container to be moved, to realize the picking and moving the stock container to be moved.

In an embodiment, an RGBD image sensor such as Kinect can be used to perform the action of image capturing. The captured image is an RGBD image. Each pixel in the RGBD image has red (R) pixel information, green (G) pixel information, blue (B) pixel information, and corresponding depth information. The R color information, the G color information, and the B color information of each pixel in the RGBD image collectively form an RGB image. The depth information of each pixel in the RGBD image collectively form a two-dimensional pixel matrix of the scene, i.e., a depth map. A pixel value of each pixel in the depth map represents a distance between a point of the object corresponding to the pixel and a plane where the RGBD image sensor is located. The position of a pixel corresponds to a position of the point of the object corresponding to the pixel in the scene and corresponds to a position in the associated RGB image.

In an embodiment, for moving the stock container to be moved, the intelligent forklift follows a predetermined route and moves to the storage location where the stock container to be moved is located, such as the storage region or the item shelf region where the pallet having the fork hole structure is stored. The intelligent forklift controls to lift up and down the fork to a position having the same height as the storage location of the stock container to be moved. In an embodiment, the height where the fork is located, the carried weight, or the operation action of the fork can be monitored. If it is monitored that the fork moves to the position having the same height as the stock container to be moved and the action of lifting up the stock container to be moved is finished, continuous capturing of the RGBD image frames is triggered.

In block 520, a position of the stock container in the RGB image of a current RGBD image frame is determined from the RGB image based on a predetermined container recognition model.

In this embodiment, the stock container to be moved in the RGBD image frame can be identified based on the predetermined container identification model and the position of the stock container to be moved in the RGB image can be determined from the RGB image of the current RGBD image frame. The container identification model refers to a model used to identify the stock container on the fork, which can be obtained through pre-training. In an embodiment, multiple scenes can be preset based on the above structure of the intelligent forklift and a large amount of RGB image samples can be captured while the intelligent forklift is carrying and moving the stock container in the multiple scenes. Depending on a certain scene, an RGB image sample may contain an entirety or a part of or not include the stock container and the item placed on the stock container. Thus, the RGB image samples are classified, where an RGB image that contain the stock container is taken as a positive sample and an RGB image that does not contain the stock container is taken as a negative sample. The container identification model can be trained with the SVM to obtain a trained container identification model.

In this embodiment, the trained SVM model is configured to identify the RGB image of the current RGBD image frame. A smallest circumscribed rectangle can be added for the stock container to be moved that is determined through the identification. Coordinates of at least two diagonal vertices of the smallest circumscribed rectangle added in the RGB image are stored to represent the position of the stock container to be moved in the RGB image. For example, coordinates of the upper left vertex and the lower right vertex are stored to represent the position and the size of the smallest circumscribed rectangle.

In block 530, a target region of interest containing the stock container to be moved is cut from the depth map of the current RGBD image frame based on the position of the stock container to be moved in the RGB image.

In this embodiment, since each pixel in the RGB image of the current RGBD image frame has an associated correspondence with a respective pixel in the depth map, representing different image information of the same scene, a same rectangular region can be cut from the depth image of the current RGBD image frame as the target region of interest based on the position of the stock container in the RGB image. Correspondingly, the target region of interest corresponds to the stock container to be moved and contains depth information of the stock container to be moved.

In block 540, a current pose deviation degree of the stock container to be moved is detected based on a depth feature of the target region of interest, an area feature of the target region of interest, a depth feature of a preset template to be compared, an area feature of the preset template to be compared, a preset depth feature threshold, and a preset area feature threshold.

In this embodiment, the depth feature and the area feature are used as the key information of the target region of interest, and the pose deviation degree of the stock container is detected based on the key information. In an embodiment, the depth feature refers to a sum of the depth values of all pixels in the depth map and the area feature refers to a total area of the depth map.

In this embodiment, the preset template to be compared may refer to a depth map of the stock container in a safe pose or a depth map of an image frame prior to the current RGBD image frame. In an embodiment, since the pose of the stock container to be moved is relatively safe and stable when the stock container to be moved is initially lifted up, a mean value of the depth maps of a preset number of initially captured RGBD image frames can be determined as a preset template to be compared. In addition, while the detection is performed based on the current RGBD image frame, the image frames prior to the current RGBD image frame are all without pose deviation or within the safe deviation range after the detection. Therefore, the depth map of the previous RGBD image of the current RGBD image frame can be used as a preset template to be compared. Further, the depth feature and the area feature of the preset template to be compared can be determined in the same manner of determining the depth feature and the area feature described above. The depth feature of the target region of interest is compared with the depth feature of the preset template to be compared to obtain the depth feature difference and the area feature of the target region of interest is compared with the area feature of the preset template to be compared to obtain the area feature difference In this embodiment, depending on a dangerous deviation degree of the scene, the depth feature threshold and the area feature threshold are predetermined. That is, the pose deviation degree is determined based on the depth feature difference and the area feature difference. If the determined pose deviation degree excesses a pose deviation limit defined by the depth feature threshold and/or the area feature threshold, it is determined that pose of the stock container to be moved currently deviates greatly and there is a potential safety risk, which can easily lead to unsafe or abnormal carrying or affect normal moving by other forklifts or robots in the bin storage environment.

With the technical solution according to this embodiment, when it is detected that the action of lifting up the stock container to be moved by the intelligent forklift is finished, the image capturing function is triggered, such that the RGBD images of the stock container on the fork can be continuously captured during a process of carrying and moving the stock container. Therefore, the pose deviation degree of the stock container on the fork is detected based on the RGBD image frames captured all the time. An alarm and/or a prompt are output based on the detection result of the pose deviation degree, for adjusting the pose of the stock container on the intelligent forklift. In this embodiment, by capturing the RGBD images of the stock container on the fork and identifying the container, effective detection of the pose deviation of the stock container on the fork is realized, the problem that the stock container to be moved cannot be safely moved caused by the position of the stock container changes on the fork due to external forces applied on the stock container to be moved or emergency brakes of the forklift while the stock container is being moved can be solved, and the efficiency and safety of carrying and moving the stock container by the forklift are improved.

Embodiment 4

Figure 6:
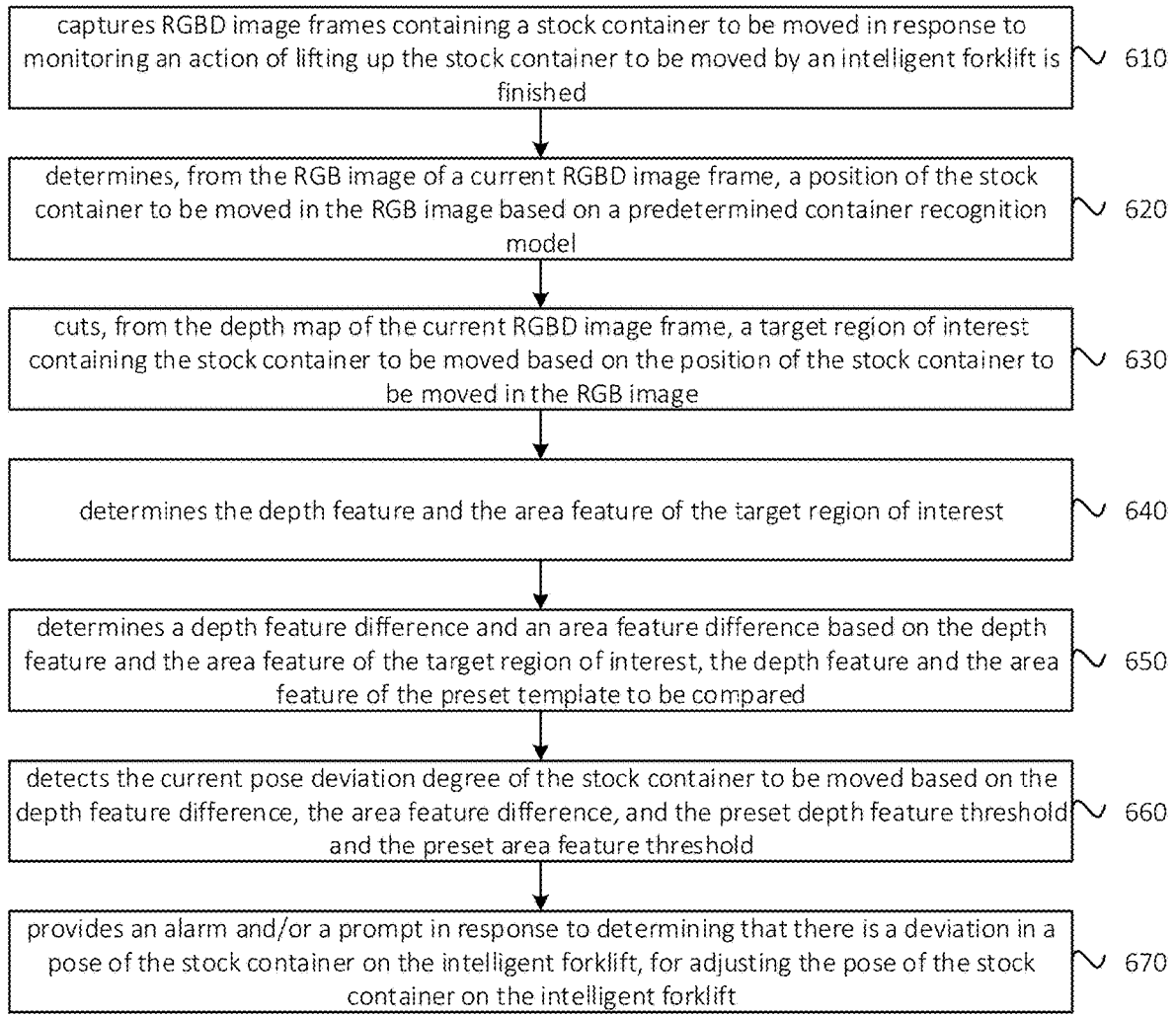
FIG. 6 is a flowchart illustrating another method for detecting a pose deviation of a container according to embodiments of the disclosure.

Based on Embodiment 3, this embodiment provides an implementation of a method for detecting a pose deviation of a container, which can detect the pose deviation degree of the stock container to be moved by identifying the stock container to be moved and determining features of the stock container to be moved. FIG. 6 is a flowchart illustrating another method for detecting a pose deviation of a container according to some embodiments of the disclosure. As illustrated in FIG. 6, the method includes the following.

In block 610, RGBD image frames of a stock container to be moved are captured in response to monitoring an action of lifting up the stock container to be moved by an intelligent forklift is finished.

In block 620, a position of the stock container to be moved in the RGB image is determined from the RGB image of a current RGBD image frame based on a predetermined container recognition model.

In this embodiment, the trained SVM model is utilized to identify the RGB image of the current RGBD image frame. A smallest circumscribed rectangle is added for the stock container to be moved that is determined through the identification. Coordinates of at least two diagonal vertices of the smallest circumscribed rectangle added in the RGB image are stored to represent the position of the stock container to be moved in the RGB image. The position can be used to represent the position and the size of the smallest circumscribed rectangle.

For example, by recognizing the container in the RGB image of the current RGBD image frame, the smallest circumscribed rectangle can be determined for the stock container to be moved in the image and the coordinates $(X_{LeftTop}, Y_{LeftTop})$ and $(X_{RightBottom}, Y_{RightBottom})$ of the smallest circumscribed rectangle can be determined. The coordinates are used to represent the position of the stock container in the RGB image.

In block 630, a target region of interest containing the stock container to be moved is cut from the depth map of the current RGBD image frame based on the position of the stock container to be moved in the RGB image.

In this embodiment, an image sensor such as a depth camera is configured to capture images while the intelligent forklift is moving. During this period, the position of the image sensor and the position of the intelligent forklift are relatively fixed. Under a normal working condition, the relative position relationship between the stock container to be moved and the item does not change. Before determining the features, a filter can be used to denoise the depth map. For example, a Gaussian low-pass filter can be used to smooth the depth map and remove noise of the depth map caused by the image sensor shake or laser reception interference, such that accurate distance information of each pixel is obtained. In an embodiment, the size of the Gaussian filter template is 3×3 or 5×5 with the standard deviation of 1. The denoising algorithm of the depth map in this embodiment is not limited to the Gaussian low-pass filter and any algorithm that can realize the denoising of the depth map can be applied in this embodiment.

In this embodiment, on the basis of the denoised depth map, since each pixel in the RGB image of the current RGBD image frame has an associated correspondence with a respective pixel in the depth map, representing different image information of the same scene, a same rectangular region can be cut from the depth map of the current RGBD image frame as the target region of interest based on the position of the stock container in the RGB image. Correspondingly, the target region of interest corresponds to the stock container to be moved and contains depth information of the stock container to be moved.

For example, in the above example, the depth map of the current RGBD image frame is denoised by the Gaussian low-pass filter to obtain the denoised depth map $D_{filter}$. Based on the position, i.e., $(X_{LeftTop}, Y_{LeftTop})$ and $(X_{RightBottom}, Y_{RightBottom})$, a corresponding rectangular region is cut from the denoised depth map $D_{filter}$ as the target region of interest.

In block 640, the depth feature and the area feature of the target region of interest are determined.

In this embodiment, since the pixel resolution of the original image is relatively high, in order to improve the detection efficiency, in this embodiment, after obtaining the target region of interest, pyramid images may be constructed for the target region of interest by performing down-sampling on the target region of interest. In an embodiment, the number of layers for the pyramid images may be determined based on the camera focal length of the RGBD sensor. Therefore, for the down-sampled region of interest image, the sum of the depth values of all pixels in the down-sampled region of interest image is calculated as the depth feature and the total area of the down-sampled region of interest image is determined as the area feature.

In an embodiment, the target region of interest is down-sampled based on a preset number of layers to obtain a down-sampled region of interest image. The depth values of respective pixels in the down-sampled region of interest image are summed up to obtain the depth feature of the target region of interest. The area of the down-sampled region of interest image is determined to obtain the area feature of the target region of interest.

For example, given the number of layers for the pyramid images is 3, the down-sampling is performed on the target region of interest $R_{D1}$, after the target region of interest $R_{D1}$ is down-sampled once to obtain the image $R_{D11}$, the size of the image $R_{D11}$ is ½ of the size of image $R_{D1}$, after performing the down-sampling twice to obtain the image $D_{D12}$, the size of the image $R_{D12}$ is ¼ of the size of the image $R_{D1}$, and after performing the down-sampling for three times to obtain the image $R_{D13}$, the size of the image $R_{D13}$ is ⅛ of the size of image $R_{D1}$. The depth values of all pixels in the image $R_{D13}$ are summed up to obtain the depth feature d. The area of the image $R_{D13}$ is used as the area feature a. That is, the key information of the current RGBD image frame can be $[R_{D13}, d, a]$.

In block 650, a depth feature difference and an area feature difference are determined based on the depth feature and the area feature of the target region of interest, and the depth feature and the area feature of the preset template to be compared.

In this embodiment, the preset template to be compared may refer to a depth map of the stock container in a safe pose or a depth map of an image frame prior to the current RGBD image frame. In an embodiment, the pose of the stock container to be moved is relatively safe and stable when the stock container to be moved is initially lifted up or the previous image frames before the current image frame are without pose deviation and within a safe deviation range while the detection is performed on the current image frame. Therefore, the preset template to be compared can at least include a standard container template or the previous RGBD image frame of the current RGBD image frame. In an embodiment, the standard container template is obtained by calculating a mean value of the depth feature and a mean value of the area feature of a preset number of initially captured RGBD image frames. The depth feature and the area feature of the preset template to be compared can be determined through the above mentioned method of determining the depth feature and the area feature. The depth feature and the area feature of the target region of interest are compared respectively with the depth feature and the area feature of the preset template to be compared to obtain the depth feature difference and the area feature difference.

For example, in an embodiment, a mean value of initial first three frames captured in response to the trigger is used as the preset template to be compared. Based on the process of calculating the depth feature and the image feature, the key information mean values of the first three RGBD image frames are used respectively as the depth feature and image feature of the preset template to be compared, i.e., $Src[R_{D13}, d, a]$. At the same time, the previous RGBD image frame of the current RGBD image frame is used as the preset template to be compared, and the key information formed by the depth feature and image feature of the previous RGBD image frame is determined as $Current[R_{D13}, d, a]$ based on the process of calculating the depth feature and image feature expressed. In this way, the depth feature difference $|d-Src(d)|$ and the area feature difference $|a-Src(a)|$ between the current RGBD image frame and the initial three RGBD image frames can be obtained, and the depth feature difference $|d-Current(d)|$ and area feature difference $|a-Current(a)|$ between the current RGBD image frame and the previous RGBD image frame can be obtained.

In block 660, a current pose deviation degree of the stock container to be moved is detected based on the depth feature difference, the area feature difference, the preset depth feature threshold, and the preset area feature threshold.

In this embodiment, depending on a dangerous deviation degree of a certain scene, the depth feature threshold and the area feature threshold are predetermined. That is, the pose deviation degree is determined based on the depth feature difference value and the area feature difference value. If the pose deviation degree excesses a pose deviation limit defined by the depth feature threshold and/or the area feature threshold, it is determined that the pose of the stock container to be moved currently has a large deviation and there is a potential safety risk, which can easily lead to unsafe or abnormal carrying or affect normal moving by other forklifts or robots in the bin storage environment.

In an embodiment, it is determined that there is a deviation in a pose of the stock container on the intelligent forklift at a current moment, in response to detecting at least one feature difference is greater than a corresponding feature threshold based on the depth feature difference and the area feature difference between the current RGBD image frame and the standard container template, the depth feature difference and the area feature difference between the current RGBD image frame and the previous RGBD image frame of the current RGBD image frame, the preset standard depth feature threshold, the preset standard area feature threshold, the preset adjacent depth feature threshold, and the preset adjacent area feature threshold.

In this embodiment, the depth feature difference between the current RGBD image frame and the standard container template is compared with the standard depth feature threshold. The area feature difference between the current RGBD image frame and the standard container template is compared with the standard area feature threshold. The depth feature difference between the current RGBD image frame and the previous RGBD image frame of the current RGBD image frame is compared with the preset adjacent depth feature threshold. The area feature difference between the current RGBD image frame and the previous RBGD image frame of the current REGBD image frame is compared with the preset adjacent area feature threshold. If at least one feature difference of the above four comparisons is greater than a corresponding feature threshold, it can be determined that the pose of the stock container on the intelligent forklift changes at the current moment.

For example, the depth feature threshold between the current RGBD image frame and the initial three RGBD image frames can be determined as $D_{CurrSrc}$, the area feature threshold between the current RGBD image frame and the initial three RGBD image frames can be determined as $S_{CurrSrc}$, the depth feature threshold between the current RGBD image frame and the previous RGBD image frame of the current RGBD image frame is determined as $D_{CurrLast}$, and the area feature threshold between the current RGBD image frame and the previous image frame of the current RGBD image frame is determined as $S_{CurrLast}$, depending on a dangerous deviation degree of a certain scene. Therefore, when at least one of $|d-Src(d)|>D_{CurrSrc}$, $|a-Src(a)|>S_{CurrSrc}$, $|d-Current(d)|>D_{CurrLast}$ and $|a-Current(a)|>S_{CurrLast}$ is met, it is determined that the stock container to be moved currently has a large deviation.

In block 670, an alarm and/or a prompt are output in response to determining that there is a deviation in a pose of the stock container on the intelligent forklift, for adjusting the pose of the stock container on the intelligent forklift.

In this embodiment, the intelligent forklift can brake and output an alarm when detecting a large deviation based on the uploaded detection data, for adjusting the pose of the stock container to be moved and/or the item on the fork of the intelligent forklift by a staff or a robot and the alarm can be cancelled. After the adjusting is finished, the intelligent forklift continues to move the stock container to be moved until the intelligent forklift moves the stock container to be moved to a destination and the stock container to be moved is released from the intelligent forklift. At the same time, image capturing and detecting are stopped.

With the technical solution according to this embodiment, the RGBD image capturing of the stock container on the fork is triggered when it is monitored that the intelligent forklift lifts up the stock container. By identifying the stock container from the RGB image of the current RGBD image frame, the position of the stock container to be moved in the RGB image is determined. The target region of interest is cut from the depth map of the current RGBD image frame based on the position. In this way, the depth feature and area feature of the target region of interest are determined. With the feature comparison is performed based on the preset template to be compared and feature thresholds, the pose deviation degree of the stock container on the fork is detected based on the feature comparison result. The alarm or the prompt is output based on the detection result of the pose deviation degree for adjusting the pose of the stock container on the intelligent forklift. In this embodiment of the disclosure, by capturing the RGBD images containing the stock container on the fork and identifying the container, effective detection of the pose deviation of the stock container on the fork is realized, the problem that the stock container to be moved cannot be safely moved caused by the position of the stock container changes on the fork due to external forces applied on the stock container to be moved or emergency brakes of the forklift while the stock container is being moved can be solved, and the efficiency and safety of carrying and moving the stock container by the forklift are improved.

Embodiment 5

Embodiments of the disclosure also provide a computer-readable storage medium. The computer-readable storage medium stores computer programs (or referred to as computer-executable instructions). When the programs are executed by a processor, a method for detecting a pose deviation of a container is executed. The method includes: capturing RGBD image frames containing a stock container to be moved in response to monitoring an action of lifting up the stock container to be moved by an intelligent forklift is finished, in which the RGBD image frame includes an RGB image and a depth map; determining, from the RGB image of a current RGBD image frame, a position of the stock container to be moved in the RGB image based on a predetermined container recognition model; cutting, from the depth map of the current RGBD image frame, a target region of interest containing the stock container to be moved based on the position of the stock container to be moved in the RGB image; and detecting a current pose deviation degree of the stock container to be moved based on a depth feature and an area feature of the target region of interest, a depth feature and an area feature of a preset template to be compared, a preset depth feature threshold, and a preset area feature threshold.

For the computer-readable storage medium provided according to embodiments of the disclosure, the computer-executable instructions stored on the computer-readable storage medium are not limited to execute the method described above and can also execute related operations of the method for detecting a pose deviation of a container according to any embodiment of the disclosure.

Based on the above description of the implementation manners, those skilled in the art can understand that the embodiments of the disclosure can be implemented by software and general-purpose hardware, and can also be implemented by hardware. Based on this understanding, the technical solution of the embodiments of the disclosure can be embodied in the form of a software product, and the computer software product can be stored in a computer-readable storage medium, such as a computer floppy disk, a read-only memory (ROM), a random access memory (RAM), a flash memory (FLASH), a hard disk or a CD-ROM, including multiple instructions to make a computer device (which can be a personal computer, a server, or a network device) to execute the method described in any embodiment of the disclosure.

The units and modules included in the device embodiments are only divided according to the functional logic, but are not limited to the above division, as long as the corresponding functions can be realized. In addition, the names of the multiple functional units are just for the convenience of distinguishing, and is not used to limit the protection scope of the disclosure.

What is claimed is:

1. An intelligent forklift, comprising: a working state monitor, at least one image sensor, and a processor; wherein:
the at least one image sensor is electrically connected with the working state monitor and the processor respectively;
the working state monitor is configured to monitor a working state of a stock container while the intelligent forklift is carrying and moving the stock container, and to control the at least one image sensor to capture an image based on the working state;
the working state monitor is configured to trigger the at least one image sensor to capture an image in response to monitoring that an action of lifting up the stock container by the intelligent forklift is finished; and stop an image capturing action of the at least one image sensor in response to monitoring an action of placing the stock container by the intelligent forklift is finished;
the at least one image sensor is configured to capture a red-green-blue-depth (RGBD) image frame containing the stock container in response to a trigger from the working state monitor, and to transmit the RGBD image frame to the processor;
the processor is configured to receive the RGBD image frame captured by the at least one image sensor during a process of moving the stock container, detect a pose deviation degree of the stock container based on the RGBD image frame; provide an alarm and/or a prompt based on a detection result of the pose deviation degree for adjusting the pose of the stock container on the intelligent forklift, wherein the pose deviation degree comprises a relative deviation degree between the stock container and a fork of the intelligent forklift, and a relative deviation degree between an item on the stock container and the stock container; and
wherein the processor is configured to detect the pose deviation degree of the stock container based on a depth feature and an area feature of a target region of interest containing the stock container, a depth feature and an area feature of a preset template to be compared, wherein the preset template to be compared at least comprises a standard container template and a previous RGBD image frame.

2. The intelligent forklift of claim 1, wherein the at least one image sensor is installed above the fork of the intelligent forklift.

3. The intelligent forklift of claim 1, wherein the RGBD image frame comprises an RGB image and a depth map, and an image used to represent the stock container is located within a designated region of the RGBD image frame.

4. The intelligent forklift of claim 3, wherein the processor is configured to:
   determine, from the RGB image of the RGBD image frame, a position of the stock container in the RGB image based on a predetermined container recognition model;
   cut the target region of interest containing the stock container from the depth map of the RGBD image frame based on the position of the stock container in the RGB image;
   determine a depth feature of the target region of interest and an area feature of the target region of interest, and determine a depth feature difference and an area feature difference based on the depth feature of the target region of interest, the area feature of the target region of interest, a depth feature of a preset template to be compared, and an area feature of the preset template to be compared; and
   detect the pose deviation degree of the stock container based on the depth feature difference, the area feature difference, a preset depth feature threshold and a preset area feature threshold.

5. The intelligent forklift of claim 4, wherein the processor is configured to:
   obtain a down-sampled region of interest image by performing down-sampling on the target region of interest based on a preset number of layers for pyramid images constructed for the target region of interest;
   obtain the depth feature of the target region of interest by summing up depth values of respective pixels contained in the down-sampled region of interest image; and
   determine an area of the down-sampled region of interest image, and obtain the area feature of the target region of interest.

6. The intelligent forklift of claim 1, wherein the standard container template is obtained based on a mean value of a preset number of initially captured RGBD image frames.

7. The intelligent forklift of claim 1, wherein the processor is configured to:
   determine that there is a deviation in a pose of the stock container on the intelligent forklift, in response to detecting at least one of:
      a depth feature difference between the RGBD image frame and the standard container template being greater than a preset standard depth feature threshold;
      an area feature difference between the RGBD image frame and the standard container template being greater than a preset standard area feature threshold;
      the depth feature difference between the RGBD image frame and the previous RGBD image frame of the RGBD image frame being greater than a preset adjacent depth feature threshold; or
      the area feature difference between the RGBD image frame and the previous RGBD image frame of the RGBD image frame being greater than the preset adjacent area feature threshold.

8. A method for detecting a pose deviation of a container, comprising:
   capturing a red-green-blue-depth (RGBD) image frame containing a stock container during a process of moving the stock container in response to monitoring an action of lifting up the stock container by an intelligent forklift is finished, wherein the RGBD image frame comprises a red-green-blue (RGB) image and a depth map;
   determining, from the RGB image of the RGBD image frame, a position of the stock container in the RGB image based on a predetermined container recognition model;
   cutting, from the depth map of the RGBD image frame, a target region of interest containing the stock container based on the position of the stock container in the RGB image;
   detecting a pose deviation degree of the stock container based on a depth feature of the target region of interest, an area feature of the target region of interest, a depth feature of a preset template to be compared, an area feature of the preset template to be compared, a preset depth feature threshold, and a preset area feature threshold; wherein the pose deviation degree comprises a relative deviation degree between the stock container and a fork of the intelligent forklift, and a relative deviation degree between an item on the stock container and the stock container; the preset template to be compared at least comprises a standard container template and a previous RGBD image frame; and
   stopping an image capturing action in response to monitoring that an action of placing the stock container by the intelligent forklift is finished.

9. The method of claim 8, wherein detecting the pose deviation degree of the stock container comprises:
   determining the depth feature of the target region of interest and the area feature of the target region of interest;
   determining a depth feature difference and an area feature difference based on the depth feature of the target region of interest, the area feature of the target region of interest, the depth feature of the preset template to be compared, and the area feature of the preset template to be compared; and
   detecting the pose deviation degree of the stock container based on the depth feature difference, the area feature difference, and the preset depth feature threshold and the preset area feature threshold.

10. The method of claim 9, wherein determining the depth feature of the target region of interest and the area feature of the target region of interest comprises:
   obtaining a down-sampled region of interest image by performing down-sampling on the target region of interest based on a preset number of layers for pyramid images constructed for the target region of interest;
   obtaining the depth feature of the target region of interest by summing up depth values of respective pixels in the down-sampled region of interest image; and
   determining an area of the down-sampled region of interest image, and obtaining the area feature of the target region of interest.

11. The method of claim 9, wherein the standard container template is obtained based on a mean value of a preset number of initially captured RGBD image frames.

12. The method of claim 9, wherein detecting the pose deviation degree of the stock container based on the depth feature difference and the area feature difference, the preset depth feature threshold and the preset area feature threshold comprises:

determining that there is a deviation in a pose of the stock container on the intelligent forklift, in response to detecting at least one of:
- the depth feature difference between the RGBD image frame and the standard container template being greater than a preset standard depth feature threshold;
- the area feature difference between the RGBD image frame and the standard container template being greater than a preset standard area feature threshold;
- the depth feature difference between the RGBD image frame and the previous RGBD image frame of the RGBD image frame being greater than a preset adjacent feature threshold; or
- the area feature difference between the RGBD image frame and the previous RGBD image frame of the RGBD image frame being greater than the preset adjacent area feature threshold.

13. The method of claim 8, further comprising:
providing an alarm and/or a prompt in response to determining that there is a deviation in a pose of the stock container on the intelligent forklift, for adjusting the pose of the stock container on the intelligent forklift.

14. A non-transitory computer-readable storage medium having computer programs stored thereon, wherein when the computer programs are executed by a processor, a method for detecting a pose deviation of a container is executed, the method comprising:
capturing a red-green-blue-depth (RGBD) image frame containing a stock container during a process of moving the stock container in response to monitoring an action of lifting up the stock container by an intelligent forklift is finished, wherein the RGBD image frame comprises a red-green-blue (RGB) image and a depth map;
determine, from the RGB image of the RGBD image frame, a position of the stock container in the RGB image based on a predetermined container recognition model;
cut, from the depth map of the RGBD image frame, a target region of interest containing the stock container based on the position of the stock container in the RGB image;
detect a pose deviation degree of the stock container based on a depth feature of the target region of interest, an area feature of the target region of interest, a depth feature of a preset template to be compared, an area feature of the preset template to be compared, a preset depth feature threshold, and a preset area feature threshold; wherein the pose deviation degree comprises a relative deviation degree between the stock container and a fork of the intelligent forklift, and a relative deviation degree between an item on the stock container and the stock container; the preset template to be compared at least comprises a standard container template and a previous RGBD image frame; and
stopping an image capturing action in response to monitoring that an action of placing the stock container by the intelligent forklift is finished.

15. The non-transitory computer-readable storage medium of claim 14, wherein detecting the pose deviation degree of the stock container comprises:
determining the depth feature of the target region of interest and the area feature of the target region of interest;
determining a depth feature difference and an area feature difference based on the depth feature of the target region of interest, the area feature of the target region of interest, the depth feature of the preset template to be compared, and the area feature of the preset template to be compared; and
detecting the pose deviation degree of the stock container based on the depth feature difference, the area feature difference, and the preset depth feature threshold and the preset area feature threshold.

16. The non-transitory computer-readable storage medium of claim 15, wherein determining the depth feature of the target region of interest and the area feature of the target region of interest comprises:
obtaining a down-sampled region of interest image by performing down-sampling on the target region of interest based on a preset number of layers for pyramid images constructed for the target region of interest;
obtaining the depth feature of the target region of interest by summing up depth values of respective pixels in the down-sampled region of interest image; and
determining an area of the down-sampled region of interest image, and obtaining the area feature of the target region of interest.

17. The non-transitory computer-readable storage medium of claim 14, wherein the method further comprises:
providing an alarm and/or a prompt in response to determining that there is a deviation in a pose of the stock container on the intelligent forklift, for adjusting the pose of the stock container on the intelligent forklift.

* * * * *